United States Patent
Michailovski et al.

(10) Patent No.: US 12,478,982 B2
(45) Date of Patent: Nov. 25, 2025

(54) COLLECTOR COMPOSITION

(71) Applicant: BASF SE, Ludwigshafen am Rein (DE)

(72) Inventors: Alexej Michailovski, Ludwigshafen (DE); Daniel Chipfunhu, Kwinana (AU); Scott Alexander Dickie, Auckland (NZ)

(73) Assignee: BASF SE, Ludwigshafen am Rhein (DE)

( * ) Notice: Subject to any disclaimer, the term of this patent is extended or adjusted under 35 U.S.C. 154(b) by 851 days.

(21) Appl. No.: 17/637,999

(22) PCT Filed: Aug. 28, 2020

(86) PCT No.: PCT/EP2020/074040
§ 371 (c)(1),
(2) Date: Feb. 24, 2022

(87) PCT Pub. No.: WO2021/038017
PCT Pub. Date: Mar. 4, 2021

(65) Prior Publication Data
US 2022/0266262 A1 Aug. 25, 2022

(30) Foreign Application Priority Data

Aug. 29, 2019 (EP) .................................. 19194277

(51) Int. Cl.
*B03D 1/008* (2006.01)
*B03D 1/01* (2006.01)
*C01B 33/22* (2006.01)
*C01B 33/32* (2006.01)

(52) U.S. Cl.
CPC .............. *B03D 1/008* (2013.01); *B03D 1/01* (2013.01); *C01B 33/22* (2013.01); *C01B 33/325* (2013.01); *B03D 2201/02* (2013.01)

(58) Field of Classification Search
CPC ... C01B 33/325; C01B 33/22; B03D 2201/02; B03D 1/01; B03D 1/008

USPC ............................................................ 252/61
See application file for complete search history.

(56) References Cited

U.S. PATENT DOCUMENTS

| | | | |
|---|---|---|---|
| 3,189,407 A | 6/1965 | Botton et al. | |
| 4,514,290 A * | 4/1985 | Swiatkowski | B03D 1/021 252/61 |

FOREIGN PATENT DOCUMENTS

| | | |
|---|---|---|
| CA | 696914 A | 11/1964 |
| CN | 101850304 B | 9/2012 |
| CN | 107828489 A | 3/2018 |
| CN | 106622636 B | 5/2019 |
| DE | 4105384 A1 | 8/1991 |
| RU | 1796614 C | 2/1993 |
| WO | 2018/114741 A1 | 6/2018 |

OTHER PUBLICATIONS

CN101850304B—English translation (Year: 2012).*
Safety Data Sheet "Crodasinic O", Verison 1, Jul. 19, 2011, pp. 1-7.
International Search Report on International Patent Application No. PCT/EP2020/074040, dated Nov. 26, 2020, 4 pages.
European Search Report for EP Patent Application No. 19194277.0, Issued on Mar. 12. 2020, 3 pages.
Tadesse, et al., "The Beneficiation of Lithium Minerals From Hard Rock Ores: A Review", Minerals Engineering, vol. 131, Jan. 15, 2019, pp. 170-184.

* cited by examiner

*Primary Examiner* — Anita Nassiri-Motlagh
(74) *Attorney, Agent, or Firm* — Faegre Drinker Biddle & Reath LLP

(57) ABSTRACT

The present invention relates to a collector composition for the beneficiation of lithium silicates and magnesium silicates from an ore comprising different silicate minerals, their use in flotation processes and a method for the beneficiation of lithium silicates- and magnesium silicates-containing minerals using said collector composition.

21 Claims, No Drawings

COLLECTOR COMPOSITION

FIELD OF THE INVENTION

The present invention relates to a collector composition for the beneficiation of lithium silicates and magnesium silicates from an ore comprising different silicate minerals, their use in flotation processes and a method for the beneficiation of lithium silicates- and magnesium silicates-containing minerals using said collector composition.

BACKGROUND OF THE INVENTION

The demand for lithium and magnesium has skyrocketed because of the increasing application of lithium ion batteries. Thus, there is a need to develop a beneficiation method for lithium and magnesium minerals from low grade hard rock lithium and magnesium ores.

There are more than 100 different varieties and subvarieties of lithium and magnesium minerals and ores. However, the best-known lithium silicate or magnesium silicate minerals that are used for commercial exploitation are selected from the group consisting of spodumene, petalite, lepidolite, hectorite, olivine and forsterite.

One of the processes that is used for the recovery of lithium comprises decomposition of the lithium-containing ore and dissolving all of the metallic constituents thereof in an acid, such as sulfuric acid. Such a process has been carried out successfully on lepidolite and amblygonite ores, which are relatively rich in lithium; but, even in the case of these ores, the extensive purification required makes the decomposition process costly and prohibitive. It has never been possible to employ the decomposition process on spodumene.

U.S. Pat. No. 3,189,407 A describes a process in which lithium is said to be recovered from low grade lithium minerals, such as lepidolite, by reaction of the mineral with sulfuric acid. Lithium is ultimately precipitated from the solution. In this process, lepidolite is first pulped with an acid and is heated to a temperature of between 140° C. and 200° C., preferably 150° C. to 170° C. (an acid bake) in what is said to be an effort to react only with the lepidolite and not the gangue that may be present. The bake is run over a period of up to 4 hours and only small levels of aluminium and potassium are said to be dissolved. Most of the water which is present evaporates during the bake, leaving a product substantially in the form of a thick paste. This paste is then re-pulped in water. Aluminium is then precipitated through the addition of an alkali or alkali earth carbonate to increase the pH to between 3.5 to 4.5.

CN 101850304 B discloses a lithium/beryllium floatation regulator and a preparation method thereof. The method comprises the steps of floating the less than 200 mesh fine ore of lithium/beryllium minerals with a N-methyl 2-fatty-acylaminoactate at a concentration of 5 to 10 wt. % in an aqueous solution. This mixture is stirred for 10 to 30 minutes and floated with a collector to get the desired enriched mineral.

The use of fatty acids as collector/co-collector for the beneficiation of lithium ores is known in the literature. However high doses of the collector compositions at a long floatation time are required. There are several other floatation processes which are disclosed in literature for the beneficiation of lithium and magnesium. However, none of the known techniques is sufficient enough to produce an economically viable solution for the beneficiation of lithium ore.

Thus, it is an object of the presently claimed invention to provide a collector composition that can be used in a low amount to produce a high-grade lithium silicate and magnesium silicate which can be isolated in high yield within a shorter time period.

SUMMARY OF THE INVENTION

Surprisingly, it was found that a high-grade lithium silicate and magnesium silicate can be obtained in a high yield by using the collector composition according to the presently claimed invention in comparatively low amounts within a shorter time period. The composition of the presently claimed invention lead to the formation of a manageable metastable froth without compromising the flotation process.

Thus, in a first aspect, the presently claimed invention is directed to the use of a collector composition for the beneficiation of lithium silicate minerals and magnesium silicate minerals from an ore comprising different silicate minerals, wherein the composition comprises:
A. at least one component (A) selected from compounds of formula (I) and salts thereof, $$G^1\text{-C}(=O)\text{—NR—CH}(R^1)\text{—C}(=O)\text{—OH} \qquad \text{formula (I),}$$

wherein $G^1$ is a linear or branched, substituted or unsubstituted, saturated or unsaturated $C_6$-$C_{30}$ hydrocarbon chain; and R and $R^1$ independent of each other are selected from the group consisting of hydrogen and linear or branched, substituted or unsubstituted, saturated or unsaturated $C_1$-$C_{30}$ hydrocarbon chain; and B. at least one component (B) selected from the group consisting of saturated or unsaturated alcohols containing at least 10 carbon atoms (B1) and an ester containing at least 10 carbon atoms (B2) derived from a mono-, di- or tri-functional carboxylic acid.

In a second aspect, the presently claimed invention is directed to a direct flotation process for the beneficiation of lithium silicate and magnesium silicate from a silicate ore comprising the steps of:
a. comminution of ores in water to obtain an aqueous mixture,
b. adjusting the pH of the aqueous mixture obtained in step a) to obtain a pH adjusted aqueous mixture,
c. optionally, conditioning of the ores with depressants and/or activators,
d. adding the collector composition to the pH adjusted aqueous mixture,
e. agitating the pH adjusted aqueous mixture obtained in step d) under air injection to generate froth, and
f. collection of the mineral selected from lithium containing silicates and magnesium containing silicates in the froth,
wherein the collector composition is defined as above and below.

In a third aspect, the presently claimed invention is directed to a reverse flotation process for the removal of lithium silicate and magnesium silicate from an ore comprising the steps of:
a. comminution of ores in water to obtain an aqueous mixture,
b. adjusting the pH of the aqueous mixture obtained in step a) to obtain a pH adjusted aqueous mixture,
c. optionally, conditioning of the ores with depressants and/or activators, d. adding the collector composition to the pH adjusted aqueous mixture,
e. agitating the pH adjusted aqueous mixture obtained in step d) under air injection to generate froth, and
f. collection of the mineral selected from lithium containing silicates and magnesium containing silicates,
wherein the collector composition is as defined as above and below.

In a fourth aspect, the presently claimed invention is directed to a collector composition for the beneficiation of lithium silicate and magnesium silicate from a silicate ore comprising:

A. at least one component (A) selected from compounds of formula (I) and salts thereof,

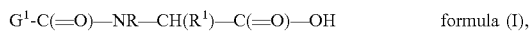
$$G^1\text{-C}(=O)\text{-NR-CH}(R^1)\text{-C}(=O)\text{-OH} \qquad \text{formula (I)},$$

wherein $G^1$ is a linear or branched, substituted or unsubstituted, saturated or unsaturated $C_6$-$C_{30}$ hydrocarbon chain; and R and $R^1$ independent of each other are selected from the group consisting of hydrogen and linear or branched, substituted or unsubstituted, saturated or unsaturated $C_1$-$C_{30}$ hydrocarbon chain; and B. at least one component (B) selected from the group consisting of saturated or unsaturated alcohol containing at least 10 carbon atoms (B1) and an ester containing at least 10 carbon atoms (B2) which is derived from a mono-, di- or tri-functional carboxylic acid.

DETAILED DESCRIPTION OF THE INVENTION

Before the present compositions and formulations of the presently claimed invention are described, it is to be understood that this invention is not limited to particular compositions and formulations described, since such compositions and formulation may, of course, vary. It is also to be understood that the terminology used herein is not intended to be limiting, since the scope of the presently claimed invention will be limited only by the appended claims.

If hereinafter a group is defined to comprise at least a certain number of embodiments, this is meant to also encompass a group which preferably consists of these embodiments only. Furthermore, the terms 'first', 'second', 'third' or 'a', 'b', 'c', etc. and the like in the description and in the claims, are used for distinguishing between similar elements and not necessarily for describing a sequential or chronological order. It is to be understood that the terms so used are interchangeable under appropriate circumstances and that the embodiments of the presently claimed invention described herein are capable of operation in other sequences than described or illustrated herein. In case the terms 'first', 'second', 'third' or '(A)', '(B)' and '(C)' or '(a)', '(b)', '(c)', '(d)', 'i', 'ii' etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

Furthermore, the ranges defined throughout the specification include the end values as well i.e. a range of 1 to 10 implies that both 1 and 10 are included in the range. For the avoidance of doubt, applicant shall be entitled to any equivalents according to applicable law.

In the following passages, different aspects of the presently claimed invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to 'one embodiment' or 'an embodiment' means that a particular feature, structure or characteristic described in connection with the embodiment is included in at least one embodiment of the presently claimed invention. Thus, appearances of the phrases 'in one embodiment' or 'in an embodiment' in various places throughout this specification are not necessarily all referring to the same embodiment, but may.

Furthermore, the particular features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the presently claimed invention, and form different embodiments, as would be understood by those in the art. For example, in the appended claims, any of the claimed embodiments can be used in any combination.

As used herein, the term "flotation" relates to the separation of minerals based on differences in their hydrophobicity and their different ability to adhere or attach to air bubbles. The aim of flotation as mineral processing operation is to selectively separate certain materials. In particular, the flotation is used for the beneficiation of a specific economically desired mineral from ore containing said mineral. Flotation comprises froth flotation methods like for example direct flotation or reverse flotation. Direct flotation of a mineral refers to methods, wherein the particular mineral is collected in the froth and the impurities remain in the slurry. Reverse flotation or inverse flotation of a mineral relates to methods, wherein the impurities as undesired materials are collected in the froth and the desired minerals remain in the slurry as cell product As used herein, the term "cell product" has the similar meaning as cell underflow or slurry and means the product remaining in the cell.

As used herein, the term "froth product" means the product obtained in the froth.

As used herein, the term "concentrate" has the meaning of flotation product and refers to the material obtained as cell product (desired material) in reverse flotation processes as well as to froth product as the material obtained in the froth (desired material) in direct flotation processes.

As used herein, the term "tailings" or "flotation tailings" is understood economically and means the undesired products and impurities which are removed in direct or reverse flotation processes.

As used herein, the term "grade" relates to the content of the desired mineral or valuable or targeted material in the obtained concentrate after the enrichment via flotation.

As used herein, the term "recovery" refers to the percentage of valuable material recovered after the enrichment via flotation. The relationship of grade (concentration) vs. recovery (amount) is a measure for the selectivity of froth flotation. The selectivity increases with increasing values for grade and/or recovery. With the selectivity the effectiveness/performance of the froth flotation can be described.

In a first embodiment, the presently claimed invention is directed to the use of a collector composition for the beneficiation of lithium silicate minerals and magnesium silicate minerals from an ore comprising different silicate minerals, wherein the composition comprises:

A. at least one component (A) selected from compounds of formula (I) and salts thereof, $$G^1\text{-}C(=O)\text{---}NR\text{---}CH(R^1)\text{---}C(=O)\text{---}OH \qquad \text{formula (I)},$$

wherein $G^1$ is a linear or branched, substituted or unsubstituted, saturated or unsaturated $C_6$-$C_{30}$ hydrocarbon chain; and R and $R^1$ independent of each other are selected from the group consisting of hydrogen and linear or branched, substituted or unsubstituted, saturated or unsaturated $C_1$-$C_{30}$ hydrocarbon chain; and B. at least one component (B) selected from the group consisting of saturated or unsaturated alcohols containing at least 10 carbon atoms (B1) and an ester containing at least 10 carbon atoms (B2) derived from a mono-, di- or tri-functional carboxylic acids; more preferably the composition comprises:

A. at least one component (A) selected from compounds of formula (I) and salts thereof, $$G^1\text{-}C(=O)\text{---}NR\text{---}CH(R^1)\text{---}C(=O)\text{---}OH \qquad \text{formula (I)},$$

wherein $G^1$ is a linear or branched, substituted or unsubstituted, saturated or unsaturated $C_8$-$C_{30}$ hydrocarbon chain; and R and $R^1$ independent of each other are selected from the group consisting of hydrogen and linear or branched, substituted or unsubstituted, saturated or unsaturated $C_1$-$C_{20}$ hydrocarbon chain; and at least one component (B) selected from the group consisting of saturated or unsaturated alcohols containing at least 10 carbon atoms (B1) and an ester containing at least 10 carbon atoms (B2) derived from a mono-, di- or tri-functional carboxylic acid;

even more preferably the composition comprises:

A. at least one component (A) selected from compounds of formula (I) and salts thereof, $$G^1\text{-}C(=O)\text{---}NR\text{---}CH(R^1)\text{---}C(=O)\text{---}OH \qquad \text{formula (I)},$$

wherein $G^1$ is a linear or branched, substituted or unsubstituted, saturated or unsaturated $C_{10}$-$C_{24}$ hydrocarbon chain; and R and $R^1$ independent of each other are selected from the group consisting of hydrogen and linear or branched, substituted or unsubstituted, saturated or unsaturated $C_1$-$C_{10}$ hydrocarbon chain; and B. at least one component (B) selected from the group consisting of saturated or unsaturated alcohols containing at least 10 carbon atoms (B1) and an ester containing at least 10 carbon atoms (B2) derived from a mono-, di- or tri-functional carboxylic acid; most preferably the composition comprises:

A. at least one component (A) selected from compounds of formula (I) and salts thereof, $$G^1\text{-}C(=O)\text{---}NR\text{---}CH(R^1)\text{---}C(=O)\text{---}OH \qquad \text{formula (I)},$$

wherein $G^1$ is a linear or branched, substituted or unsubstituted, saturated or unsaturated $C_{12}$-$C_{22}$ hydrocarbon chain; and R and $R^1$ independent of each other are selected from the group consisting of hydrogen and linear or branched, substituted or unsubstituted, saturated or unsaturated $C_1$-$C_6$ hydrocarbon chain; and at least one component (B) selected from the group consisting of saturated or unsaturated alcohols containing at least 10 carbon atoms (B1) and an ester containing at least 10 carbon atoms (B2) derived from a mono-, di- or tri-functional carboxylic acid; and in particular the composition comprises:

A. at least one component (A) is selected from compounds of formula (I) and salts thereof, $$G^1\text{-}C(=O)\text{---}NR\text{---}CH(R^1)\text{---}C(=O)\text{---}OH \qquad \text{formula (I)},$$

wherein $G^1$ is a linear or branched, saturated or unsaturated $C_{14}$-$C_{18}$ hydrocarbon chain; and R and $R^1$ independent of each other are selected from the group consisting of hydrogen and linear or branched, saturated $C_1$-$C_3$ hydrocarbon chain; and B. at least one component (B) selected from the group consisting of saturated or unsaturated alcohols containing at least 10 carbon atoms (B1) and an ester containing at least 10 carbon atoms (B2) derived from a mono-, di- or tri-functional carboxylic acid.

In another preferred embodiment the lithium silicate or the magnesium silicate minerals are selected from the group consisting of spodumene, petalite, lepidolite, hectorite, olivine and forsterite, more preferably the lithium silicate or the magnesium silicate minerals are selected from the group consisting of spodumene, petalite, olivine and forsterite; most preferably the lithium silicate or the magnesium silicate minerals are selected from the group consisting of spodumene, petalite and olivine; and in particular preferably the lithium silicate or the magnesium silicate minerals are selected from the group consisting of spodumene and olivine.

In another preferred embodiment the at least one component (A) is selected from compounds of formula (I) and salts thereof, $$G^1\text{-}C(=O)\text{---}NR\text{---}CH(R^1)\text{---}C(=O)\text{---}OH \qquad \text{formula (I)},$$

wherein $G^1$ is a linear or branched, substituted or unsubstituted, saturated or unsaturated $C_6$-$C_{30}$ hydrocarbon chain; and R and $R^1$ independent of each other are selected from the group consisting of hydrogen and linear or branched, substituted or unsubstituted, saturated or unsaturated $C_1$-$C_{30}$ hydrocarbon chain.

In another preferred embodiment, $G^1$ is a linear or branched, substituted or unsubstituted, saturated or unsaturated $C_{10}$-$C_{30}$ hydrocarbon chain; more preferably $G^1$ is a linear or branched, substituted or unsubstituted, saturated or unsaturated $C_{12}$-$C_{24}$ hydrocarbon chain; most preferably $G^1$ is a linear or branched, substituted or unsubstituted, saturated or unsaturated $C_{14}$-$C_{20}$ hydrocarbon chain and in particular preferably $G^1$ is a linear or branched, substituted or unsubstituted, saturated or unsaturated $C_{16}$-$C_{18}$ hydrocarbon chain.

In another preferred embodiment, $G^1$ is a linear, unsubstituted and saturated $C_{10}$-$C_{30}$ hydrocarbon chain selected from the group consisting of $CH_3(CH_2)_9-$, $CH_3(CH_2)_{10}-$, $CH_3(CH_2)_{11}-$, $CH_3(CH_2)_{12}-$, $CH_3(CH_2)_{13}-$, $CH_3(CH_2)_{14}-$, $CH_3(CH_2)_{15}-$, $CH_3(CH_2)_{16}-$, $CH_3(CH_2)_{17}-$, $CH_3(CH_2)_{18}-$, $CH_3(CH_2)_{19}-$, $CH_3(CH_2)_{20}-$, $CH_3(CH_2)_{21}-$, $CH_3(CH_2)_{22}-$, $CH_3(CH_2)_{23}-$, $CH_3(CH_2)_{24}-$, $CH_3(CH_2)_{25}-$, $CH_3(CH_2)_{26}-$, $CH_3(CH_2)_{27}-$, $CH_3(CH_2)_{28}-$, and $CH_3(CH_2)_{29}-$; more preferably selected from the group consisting of $CH_3(CH_2)_{13}-$, $CH_3(CH_2)_{14}-$, $CH_3(CH_2)_{15}-$, $CH_3(CH_2)_{16}-$, $CH_3(CH_2)_{17}-$, $CH_3(CH_2)_{18}-$, $CH_3(CH_2)_{19}-$, $CH_3(CH_2)_{20}-$, $CH_3(CH_2)_{21}-$, $CH_3(CH_2)_{22}$—, $CH_3(CH_2)_{23}$—, $CH_3(CH_2)_{24}$—, $CH_3(CH_2)_{25}$—, $CH_3(CH_2)_{26}$—, $CH_3(CH_2)_{27}$—, $CH_3(CH_2)_{28}$—, and $CH_3(CH_2)_{29}$—; even more preferably selected from the group consisting of $CH_3(CH_2)_{13}$—, $CH_3(CH_2)_{14}$—, $CH_3(CH_2)_{15}$—, $CH_3(CH_2)_{16}$—, $CH_3(CH_2)_{17}$—, $CH_3(CH_2)_{18}$—, $CH_3(CH_2)_{19}$—, $CH_3(CH_2)_{20}$—, $CH_3(CH_2)_{21}$—, $CH_3(CH_2)_{22}$—, $CH_3(CH_2)_{23}$—, and $CH_3(CH_2)_{24}$—; most preferably selected from the group consisting of $CH_3(CH_2)_{15}$—, $CH_3(CH_2)_{16}$—, $CH_3(CH_2)_{17}$—, $CH_3(CH_2)_{18}$—, $CH_3(CH_2)_{19}$—, $CH_3(CH_2)_{20}$—; and $CH_3(CH_2)_{21}$—; and in particular preferably selected from the group consisting of $CH_3(CH_2)_{15}$—, $CH_3(CH_2)_{16}$—, $CH_3(CH_2)_{17}$—, and $CH_3(CH_2)_{18}$—.

In another preferred embodiment, $G^1$ is a linear, unsubstituted and unsaturated $C_{10}$-$C_{30}$ hydrocarbon chain selected from the group consisting of $CH_3CH_2CH=CHCH_2CH=CHCH_2CH=CH(CH_2)_7$—, $CH_3CH_2CH=CHCH_2CH=CHCH_2CH=CHCH_2CH=CH(CH_2)_4$—, $CH_3CH_2CH=CHCH_2CH=CHCH_2CH=CHCH_2CH=CH(CH_2)_3$—, $CH_3CH_2CH=CHCH_2CH=CHCH_2CH=CHCH_2CH=CHCH_2CH=CH(CH_2)_2$—, $CH_3(CH_2)_4CH=CHCH_2CH=CH(CH_2)_7$—, $CH_3(CH_2)_4CH=CHCH_2CH=CHCH_2CH=CH(CH_2)_4$—, $CH_3(CH_2)_4CH=CHCH_2CH=CHCH_2CH=CH(CH_2)_6$—, $CH_3(CH_2)_4CH=CHCH_2CH=CHCH_2CH=CHCH_2CH=CH(CH_2)_3$—, $CH_3(CH_2)_4CH=CHCH_2CH=CHCH_2CH=CHCH_2CH=CH(CH_2)_5$—, $CH_3(CH_2)_5CH=CH(CH_2)_7$—, $CH_3(CH_2)_5CH=CH(CH_2)_9$—, $CH_3(CH_2)_5CH=CH(CH_2)_{11}$—, $CH_3(CH_2)_7CH=CH(CH_2)_7$—, $CH_3(CH_2)_7CH=CH(CH_2)_9$—, $CH_3(CH_2)_7CH=CH(CH_2)_{11}$—, $CH_3(CH_2)_7CH=CH(CH_2)_{13}$—, and $CH_3(CH_2)_7CH=CHCH_2CH=CHCH_2CH=CH(CH_2)_3$—; more preferably selected from the group consisting of $CH_3CH_2CH=CHCH_2CH=CHCH_2CH=CH(CH_2)_7$—, $CH_3CH_2CH=CHCH_2CH=CHCH_2CH=CHCH_2CH=CH(CH_2)_4$—, $CH_3(CH_2)_4CH=CHCH_2CH=CH(CH_2)_7$—, $CH_3(CH_2)_4CH=CHCH_2CH=CHCH_2CH(CH_2)_4$—, $CH_3(CH_2)_5CH=CH(CH_2)_7$—, $CH_3(CH_2)_5CH=CH(CH_2)_9$—, and $CH_3(CH_2)_7CH=CH(CH_2)_7$— most preferably selected from the group consisting of $CH_3CH_2CH=CHCH_2CH=CHCH_2CH=CH(CH_2)_7$—, $CH_3(CH_2)_4CH=CHCH_2CH=CH(CH_2)_7$—, $CH_3(CH_2)_5CH=CH(CH_2)_7$—, $CH_3(CH_2)_5CH=CH(CH_2)_9$—, and $CH_3(CH_2)_7CH=CH(CH_2)_7$—; and in particular preferably selected from the group consisting of $CH_3CH_2CH=CHCH_2CH=CHCH_2CH=CH(CH_2)_7$—, $CH_3(CH_2)_5CH=CH(CH_2)_7$—, and $CH_3(CH_2)_7CH=CH(CH_2)_7$—.

In another preferred embodiment, R is selected from the group consisting of hydrogen and linear or branched, substituted or unsubstituted, saturated or unsaturated $C_1$-$C_{30}$ hydrocarbon chain; more preferably R is selected from the group consisting of hydrogen and linear or branched, substituted or unsubstituted, saturated or unsaturated $C_1$-$C_{20}$ hydrocarbon chain; even more preferably, R is selected from the group consisting of hydrogen and linear or branched, substituted or unsubstituted, saturated or unsaturated $C_1$-$C_{10}$ hydrocarbon chain; most preferably R is selected from the group consisting of hydrogen and linear or branched, substituted or unsubstituted, saturated or unsaturated $C_1$-$C_8$ hydrocarbon chain and in particular preferably R is selected from the group consisting of hydrogen and linear or branched $C_1$-$C_3$ hydrocarbon chain.

In another preferred embodiment, R is selected from the group consisting of hydrogen, —$CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, $C_{11}H_{23}$, $C_{12}H_{25}$, $C_{13}H_{27}$, $C_{14}H_{29}$, $C_{15}H_{31}$, $C_{16}H_{33}$, $C_{17}H_{35}$, $C_{18}H_{37}$, $C_{19}H_{39}$, $C_{20}H_{41}$, $C_3H_5$, $C_4H_7$, $C_5H_9$, $C_6H_{11}$, $C_7H_{13}$, $C_8H_{15}$, $C_9H_{17}$, $C_{10}H_{19}$, $C_{11}H_{21}$, $C_{12}H_{23}$, $C_{13}H_{25}$, $C_{14}H_{27}$, $C_{15}H_{29}$, $C_{16}H_{31}$, $C_{17}H_{33}$, $C_{18}H_{35}$, $C_{19}H_{37}$ and $C_{20}H_{39}$; more preferably, R is selected from the group consisting of hydrogen, —$CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, $C_{11}H_{23}$, $C_{12}H_{25}$, $C_{13}H_{27}$, $C_{14}H_{29}$, $C_{15}H_{31}$, $C_{16}H_{33}$, $C_{17}H_{35}$, $C_{18}H_{37}$, $C_{19}H_{39}$, $C_{20}H_{41}$, $C_3H_5$, $C_4H_7$, $C_5H_9$, $C_6H_{11}$, $C_7H_{13}$, $C_8H_{15}$, and $C_9H_{17}$; even more preferably R is selected from the group consisting of hydrogen, —$CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, $C_3H_5$, $C_4H_7$, $C_5H_9$, $C_6H_{11}$, $C_7H_{13}$, $C_8H_{15}$, and $C_9H_{17}$; most preferably, R is selected from the group consisting of hydrogen, —$CH_3$, $C_2H_5$, $C_3H_7$, $C_4H_9$, $C_5H_{11}$, $C_6H_{13}$, $C_3H_5$, $C_4H_7$, $C_5H_9$, and $C_6H_{11}$; and in particular preferably, R is selected from the group consisting of hydrogen, —$CH_3$, $C_2H_5$ and $C_3H_7$.

In another preferred embodiment, $R^1$ is selected from the group consisting of hydrogen and linear or branched, substituted or unsubstituted, saturated or unsaturated $C_1$-$C_+$ hydrocarbon chain; more preferably $R^1$ is selected from the group consisting of hydrogen and linear or branched, substituted or unsubstituted $C_1$-$C_{20}$ hydrocarbon chain; even more preferably, $R^1$ is selected from the group consisting of hydrogen and linear or branched, substituted or unsubstituted $C_1$-$C_{10}$ hydrocarbon chain; most preferably $R^1$ is selected from the group consisting of hydrogen and linear or branched, substituted or unsubstituted $C_1$-$C_6$ hydrocarbon chain and in particular preferably $R^1$ is consisting of hydrogen.

In another preferred embodiment, $R^1$ is selected from the group consisting of hydrogen, —$CH_3$, —$CH(CH_3)CH_2CH_3$, —$CH_2$—$CH(CH_3)CH_3$, —$CH(CH_3)_2$, —$CH_2CH_2SCH_3$, —$CH_2$-phenyl, —$CH_2$(indolyl), —$CH_2$—$C_4H_4$—OH, —$CH_2$—SH, —$CH_2CH_2C(=O)NH_2$, —$CH_2(OH)$ and —$CH(OH)CH_3$; more preferably $R^1$ is selected from the group consisting of hydrogen, —$CH_3$, —$CH(CH_3)CH_2CH_3$, —$CH_2$—$CH(CH_3)CH_3$, —$CH(CH_3)_2$, —$CH_2CH_2SCH_3$, —$CH_2$-phenyl, —$CH_2$(indolyl), —$CH_2CH_2C(=O)NH_2$, —$CH_2(OH)$ and —$CH(OH)CH_3$; even more preferably $R^1$ is selected from the group consisting of hydrogen, —$CH_3$, —$CH(CH_3)CH_2CH_3$, —$CH_2$—$CH(CH_3)CH_3$, —$CH(CH_3)_2$, —$CH_2CH_2SCH_3$ and —$CH_2$-phenyl; most preferably $R^1$ is selected from the group consisting of hydrogen, —$CH_3$, —$CH(CH_3)CH_2CH_3$, —$CH_2$—$CH(CH_3)CH_3$ and —$CH(CH_3)_2$; and in particular preferably $R^1$ is selected from the group consisting of hydrogen, —$CH_3$ and —$CH(CH_3)_2$.

In another preferred embodiment, the compounds of formula (I) are present in the form of salts selected from the group consisting of sodium salts, potassium salts and ammonium salts.

In another preferred embodiment, the compounds of formula (I) and salts thereof are selected from the group consisting of N-oleoyl sarcosine, N-lauroyl sarcosine, N-cocoyl sarcosine, N-myristoyl sarcosine, N-palmityl sarcosine, N-stearyl sarcosine, N-vaccenyl sarcosine, N-eicosenoyl sarcosine, N-erucyl sarcosine, N-eicosadienoyl sarcosine, N-docosadienoyl sarcosine, N-linolenyl sarcosine, N-linoleyl sarcosine, sodium N-oleoyl sarcosinate, sodium N-lauroyl sarcosinate, sodium N-cocoyl sarcosinate, sodium N-myristoyl sarcosinate, sodium N-palmityl sarcosinate, sodium N-stearyl sarcosinate, sodium N-vaccenyl sarcosinate, sodium N-eicosenoyl sarcosinate, sodium N-erucyl sarcosinate, sodium N-eicosadienoyl sarcosinate, sodium N-docosadienoyl sarcosinate, sodium N-linolenyl sarcosinate, sodium N-linoleyl sarcosinate, potassium N-oleoyl sarcosinate, potassium N-lauroyl sarcosinate, potassium N-cocoyl sarcosinate, potassium N-myristoyl sarcosinate, potassium N-palmityl sarcosinate, potassium N-stearyl sarcosinate, potassium N-vaccenyl sarcosinate, potassium N-eicosenoyl sarcosinate, potassium N-erucyl sarcosinate, potassium N-eicosadienoyl sarcosinate, potassium N-docosadienoyl sarcosinate, potassium N-linolenyl sarcosinate, potassium N-linoleyl sarcosinate, ammonium N-oleoyl sarcosinate, ammonium N-lauroyl sarcosinate, ammonium N-cocoyl sarcosinate, ammonium N-myristoyl sarcosinate, ammonium N-palmityl sarcosinate, ammonium N-stearyl sarcosinate, ammonium N-vaccenyl sarcosinate, ammonium N-eicosenoyl sarcosinate, ammonium N-erucyl sarcosinate, ammonium N-eicosadienoyl sarcosinate, ammonium N-docosadienoyl sarcosinate, ammonium N-linolenyl sarcosinate and ammonium N-linoleyl sarcosinate; more preferably, the compound of formula (I) and salts thereof is selected from the group consisting of N-oleoyl sarcosine, N-lauroyl sarcosine, N-palmityl sarcosine, N-stearyl sarcosine, N-linolenyl sarcosine, N-linoleyl sarcosine, sodium N-oleoyl sarcosinate, sodium N-lauroyl sarcosinate, sodium N-stearyl sarcosinate, sodium N-linolenyl sarcosinate, sodium N-linoleyl sarcosinate, potassium N-oleoyl sarcosinate, potassium N-lauroyl sarcosinate, potassium N-palmityl sarcosinate, potassium N-stearyl sarcosinate, potassium N-linolenyl sarcosinate, potassium N-linoleyl sarcosinate, ammonium N-oleoyl sarcosinate, ammonium N-lauroyl sarcosinate, ammonium N-palmityl sarcosinate, ammonium N-stearyl sarcosinate, ammonium N-linolenyl sarcosinate and ammonium N-linoleyl sarcosinate; even more preferably, the compound of formula (I) and salts thereof is selected from the group consisting of N-oleoyl sarcosine, N-palmityl sarcosine, N-stearyl sarcosine, sodium N-oleoyl sarcosinate, sodium N-stearyl sarcosinate, potassium N-oleoyl sarcosinate, potassium N-palmityl sarcosinate, potassium N-stearyl sarcosinate, ammonium N-oleoyl sarcosinate, ammonium N-palmityl sarcosinate and ammonium N-stearyl sarcosinate; most preferably the compound of formula (I) and salts thereof is selected from the group consisting of N-oleoyl sarcosine, N-stearyl sarcosine, sodium N-oleoyl sarcosinate, sodium N-stearyl sarcosinate, potassium N-oleoyl sarcosinate, potassium N-stearyl sarcosinate, ammonium N-oleoyl sarcosinate, and ammonium N-stearyl sarcosinate; and in particular preferably the compound of formula (I) and salts thereof is selected from the group consisting of N-oleoyl sarcosine, sodium N-oleoyl sarcosinate, potassium N-oleoyl sarcosinate and ammonium N-oleoyl sarcosinate.

In another preferred embodiment, the at least one component (B) is selected from the group consisting of saturated or unsaturated alcohols containing at least 10 carbon atoms (B1) and an ester containing at least 10 carbon atoms (B2) derived from a mono-, di- or tri-functional carboxylic acid; more preferably the at least one component (B) is selected from the group consisting of saturated or unsaturated alcohols containing 10 to 40 carbon atoms (B1) and an ester containing 10 to 40 carbon atoms (B2) derived from a mono-, di- or tri-functional carboxylic acid.

In another preferred embodiment, the at least one component (B) is selected from saturated or unsaturated alcohols containing at least 10 carbon atoms (B1); more preferably the at least one component (B) is selected from the group consisting of saturated alcohols containing at least 10 carbon atoms (B1); most preferably the at least one component (B) is selected from the group consisting of saturated alcohols containing 10 to 40 carbon atoms (B1); and in particular preferably the at least one component (B) is selected from the group consisting of saturated alcohols containing 10 to 20 carbon atoms (B1); and each case the alcohols have a have a degree of branching in the range of 1 to 3.

In another preferred embodiment, the at least one component (B) is selected from saturated $C_{10}$-$C_{16}$ alcohols with an average degree of branching of 1 to 3. In another preferred embodiment, the at least one component (B) is selected from the group consisting of isotridecanol, isodecanol, isodecyl alcohol, iso undecyl alcohol, iso dodecyl alcohol, iso tridecyl alcohol, 3,5,5,7-tetramethylnonyl alcohol, iso tetradecyl alcohol, iso pentadecyl alcohol, iso hexadecyl alcohol, iso heptadecyl alcohol, iso octadecyl alcohol, iso nonadecyl alcohol and iso eicosyl alcohol.

In another preferred embodiment, the at least one component (B) is selected from saturated $C_{10}$-$C_{16}$ alcohols with an average degree of branching of 1 to 3; more preferably the at least one component (B) is a mixture of saturated $C_{10}$-$C_{16}$ alcohols with an average degree of branching of 1 to 3; most preferably the at least one component (B) is a mixture of saturated $C_{10}$-$C_{16}$ alcohols containing at least 50% isotridecanol with an average degree of branching of 1 to 3; and in particular preferably the at least one component (B) is a mixture of saturated $C_{10}$-$C_{16}$ alcohols containing at least 50% isotridecanol with an average degree of branching of 2 to 3.

In another preferred embodiment, the esters containing at least 10 carbon atoms (B2) are selected from the group consisting of monoesters containing at least 10 carbon atoms (B2a), diesters containing at least 10 carbon atoms (B2b) and triesters containing at least 10 carbon atoms (B2c); more preferably the esters containing at least 10 carbon atoms (B2) are selected from the group consisting of monoesters containing 10 to 40 carbon atoms (B2a), diesters containing 10 to 40 carbon atoms (B2b) and triesters containing 10 to 40 carbon atoms (B2c).

In another preferred embodiment, the monoesters containing at least 10 carbon atoms (B2a) are selected from the group consisting of caproic acid butyl ester, caproic acid pentyl ester, caproic acid hexyl ester, caproic acid cyclohexyl ester, caproic acid octyl ester, caproic acid isooctyl ester, caproic acid nonyl ester, caproic acid decyl ester, caproic acid lauryl ester, caproic acid myristyl ester, caproic acid cetyl ester, caproic acid pamitoleyl ester, caproic acid heptadecyl ester, caproic acid stearyl ester, caproic acid oleyl ester, caproic acid nonadecyl ester, caproic acid arachidyl ester, caproic acid henicosyl ester, caproic acid behenyl ester, caproic acid erucyl ester, caprylic acid butyl ester, caprylic acid pentyl ester, caprylic acid hexyl ester, caprylic acid cyclohexyl ester, caprylic acid octyl ester, caprylic acid isooctyl ester, caprylic acid nonyl ester, caprylic acid decyl ester, caprylic acid lauryl ester, caprylic acid myristyl ester, caprylic acid cetyl ester, caprylic acid pamitoleyl ester, caprylic acid heptadecyl ester, caprylic acid stearyl ester, caprylic acid oleyl ester, caprylic acid nonadecyl ester, caprylic acid arachidyl ester, caprylic acid henicosyl ester, caprylic acid behenyl ester, caprylic acid erucyl ester, capric acid butyl ester, capric acid pentyl ester, capric acid hexyl ester, capric acid cyclohexyl ester, capric acid octyl ester, capric acid isooctyl ester, capric acid nonyl ester, capric acid decyl ester, capric acid lauryl ester, capric acid myristyl ester, capric acid cetyl ester, capric acid pamitoleyl ester, capric acid heptadecyl ester, capric acid stearyl ester, capric acid oleyl ester, capric acid nonadecyl ester, capric acid arachidyl ester, capric acid henicosyl ester, capric acid behenyl ester, capric acid erucyl ester, lauric acid butyl ester, lauric acid pentyl ester, lauric acid hexyl ester, lauric acid cyclohexyl ester, lauric acid octyl ester, lauric acid isooctyl ester, palmitic acid butyl ester, palmitic acid pentyl ester, palmitic acid hexyl ester, palmitic acid cyclohexyl ester, palmitic acid octyl ester, palmitic acid isooctyl ester, palmitic acid nonyl ester, palmitic acid decyl ester, palmitic acid lauryl ester, palmitic acid myristyl ester, palmitic acid cetyl ester, palmitic acid pamitoleyl ester, palmitic acid heptadecyl ester, palmitic acid stearyl ester, palmitic acid oleyl ester, palmitic acid nonadecyl ester, palmitic acid arachidyl ester, palmitic acid henicosyl ester, palmitic acid behenyl ester, palmitic acid erucyl ester, d nonyl ester, lauric acid decyl ester, lauric acid lauryl ester, lauric acid myristyl ester, lauric acid cetyl ester, lauric acid pamitoleyl ester, lauric acid heptadecyl ester, lauric acid stearyl ester, lauric acid oleyl ester, lauric acid nonadecyl ester, lauric acid arachidyl ester, lauric acid henicosyl ester, lauric acid behenyl ester, lauric acid erucyl ester, myristic acid butyl ester, myristic acid pentyl ester, myristic acid hexyl ester, myristic acid cyclohexyl ester, myristic acid octyl ester, myristic acid isooctyl ester, myristic acid nonyl ester, myristic acid decyl ester, myristic acid lauryl ester, myristic acid myristyl ester, myristic acid cetyl ester, myristic acid pamitoleyl ester, myristic acid heptadecyl ester, myristic acid stearyl ester, myristic acid oleyl ester, myristic acid nonadecyl ester, myristic acid arachidyl ester, myristic acid henicosyl ester, myristic acid behenyl ester, myristic acid erucyl ester, stearic acid butyl ester, stearic acid pentyl ester, stearic acid hexyl ester, stearic acid cyclohexyl ester, stearic acid octyl ester, stearic acid isooctyl ester, stearic acid nonyl ester, stearic acid decyl ester, stearic acid lauryl ester, stearic acid myristyl ester, stearic acid cetyl ester, stearic acid pamitoleyl ester, stearic acid heptadecyl ester, stearic acid stearyl ester, stearic acid oleyl ester, stearic acid nonadecyl ester, stearic acid arachidyl ester, stearic acid henicosyl ester, stearic acid behenyl ester, stearic acid erucyl ester, benzoic acid butyl ester, benzoic acid pentyl ester, benzoic acid hexyl ester, benzoic acid cyclohexyl ester, benzoic acid octyl ester, benzoic acid isooctyl ester, benzoic acid nonyl ester, benzoic acid decyl ester, benzoic acid lauryl ester, benzoic acid myristyl ester, benzoic acid cetyl ester, benzoic acid pamitoleyl ester, benzoic acid heptadecyl ester, benzoic acid stearyl ester, benzoic acid oleyl ester, benzoic acid nonadecyl ester, benzoic acid arachidyl ester, benzoic acid henicosyl ester, benzoic acid behenyl ester and benzoic acid erucyl ester.

In another preferred embodiment, the diesters containing at least 10 carbon atoms (B2b) are selected from the group consisting of adipates, sebacates, maleates, phthalates, terephthalates, isophthalates and cyclohexane dicarboxylic acid dialkyl esters.

In another preferred embodiment, the diesters containing at least 10 carbon atoms (B2b) are selected from the group consisting of 1,2-cyclohexane dicarboxylic acid diisononyl ester, 1,2-cyclohexane dicarboxylic acid dinonyl ester, 1,2-cyclohexane dicarboxylic acid isohexyl pentyl ester, 1,2-cyclohexane dicarboxylic acid diisobutyl ester, 1,2-cyclohexane dicarboxylic acid di(2-ethylhexyl) ester, 1,2-cyclohexane dicarboxylic acid didecyl ester, 1,2-cyclohexane dicarboxylic acid nonyl 3-pentyl ester, 1,2-cyclohexane dicarboxylic acid di(2-methylbutyl) ester, 1,2-cyclohexane dicarboxylic acid hexyl octyl ester, diisodecyl adipate, diisotridecyl adipate, dioctyl adipate, diisononyl adipate, diisobutyl phthalate, dibutyl phthalate, diisoheptyl phthalate, dioctyl phthalate, diisooctyl phthalate, dinonyl phthalate, diisononyl phthalate, diisodecyl phthalate, diundecyl phthalate, diisoundecyl phthalate, undecyl dodecyl phthalate, diisotridecyl phthalate, butyl benzyl phthalate, di-2-ethylhexyl sebacate and di-2-ethylhexyl azelate.

In another preferred embodiment, the diesters containing at least 10 carbon atoms (B2b) are selected from the group consisting of tri(2-ethylhexyl) trimellitate, tridecyl trimellitate, tricaprylyl trimellitate, triisodecyl trimellitate, tri(isotridecyl) trimellitate, tri(isononyl) trimellitate, tri(2-ethylhexyl)trimellitate, tri(2-propylheptyl)trimellitate, triheptyl trimellitate, trinonyl trimellitate and trioctyl trimellitate. In another preferred embodiment, the at least one component (B) is selected from the group consisting of di(isononyl) phthalate, di(2-ethylhexyl)phthalate, di(2-propylheptyl) phthalate, di(isononyl)adipate, di(2-propylheptyl)adipate, di(2-propylheptyl)adipate and isotridecanol.

In another preferred embodiment, the presently claimed invention is directed to the use of a composition for the beneficiation of lithium silicate minerals and magnesium silicate minerals from an ore comprising different silicate minerals, wherein the composition comprises:

A. the at least one component (A) is N-oleoyl sarcosine; and
B. the at least one component (B) is selected from the group consisting of di(isononyl)phthalate, di(2-ethylhexyl)phthalate, di(2-propylheptyl)phthalate, di(isononyl)adipate, di(2-ethylhexyl)adipate, di(2-propylheptyl)adipate and isotridecanol.

In another preferred embodiment, the amount of the at least one component (A) is in the range from ≥10 wt. % to ≤99 wt. %, based on the total weight of the composition; more preferably the amount of the at least one component (A) is in the range from ≥40 wt. % to ≤99 wt. %, based on the total weight of the composition; even more preferably the amount of the at least one component (A) is in the range from ≥60 wt. % to ≤95 wt. %, based on the total weight of the composition; most preferably the amount of the at least one component (A) is in the range from ≥70 wt. % to ≤95 wt. %, based on the total weight of the composition; and in particular more preferably the amount of the at least one component (A) is in the range from ≥75 wt. % to ≤95 wt. %, based on the total weight of the composition.

In another preferred embodiment, the amount of the at least one component (B) is in the range from ≥0.10 wt. % to ≤90 wt. %, based on the total weight of the composition; more preferably the amount of the at least one component (B) is in the range from ≥5.0 wt. % to ≤50 wt. %, based on the total weight of the composition; even more preferably the amount of the at least one component (B) is in the range from ≥5.0 wt. % to ≤40 wt. %, based on the total weight of the composition; most preferably the amount of the at least one component (B) is in the range from ≥5.0 wt. % to ≤30 wt. %, based on the total weight of the composition; and in particular more preferably the amount of the at least one component (B) is in the range from ≥5.0 wt. % to ≤25 wt. %, based on the total weight of the composition.

In another preferred embodiment, the composition comprises the at least one component (A) in an amount in the range from ≥10 wt. % to ≤99 wt. % and the at least one component (B) in an amount in the range from ≥1.0 wt. % to ≤90 wt. %, based on the total weight of the composition; more preferably the at least one component (A) in an amount in the range from ≥50 wt. % to ≤99 wt. % and the at least one component (B) in an amount in the range from ≥1.0 wt. % to ≤50 wt. %, based on the total weight of the composition; even more preferably the at least one component (A) in an amount in the range from ≥60 wt. % to ≤95 wt. % and the at least one component (B) in an amount in the range from ≥1.0 wt. % to ≤40 wt. %, based on the total weight of the composition; most preferably the at least one component (A) in an amount in the range from ≥70 wt. % to ≤95 wt. % and the at least one component (B) in an amount in the range from ≥5.0 wt. % to ≤30 wt. %, based on the total weight of the composition; and in particular preferably the at least one component (A) in an amount in the range from ≥75 wt. % to ≤95 wt. % and the at least one component (B) in an amount in the range from ≥5.0 wt. % to ≤25 wt. %, based on the total weight of the composition.

In another preferred embodiment, the composition comprises additives and/or modifier in an amount in the range from 0% to 10%, more preferably in the range from 0.2% to 8%, even more preferably in the range from 0.4% to 6% and most preferably in the range from 0.5% to 5%.

In another preferred embodiment, the presently claimed invention is directed to a direct flotation process for the beneficiation of lithium silicate and magnesium silicate from an ore consisting of silicates, comprising the steps of:

a. comminution of ores in water to obtain an aqueous mixture,
b. adjusting the pH of the aqueous mixture obtained in step a) to obtain a pH adjusted aqueous mixture,
c. optionally, conditioning of the ores with depressants and/or activators,
d. adding the collector composition to the pH adjusted aqueous mixture,
e. agitating the pH adjusted aqueous mixture obtained in step d) under air injection to generate froth, and
f. collection of the mineral selected from lithium containing silicates and magnesium containing silicates in the froth, wherein the collector composition is as defined as above.

In another preferred embodiment, the presently claimed invention is directed to a reverse flotation process for the removal of lithium silicate and magnesium silicate from an ore comprising the steps of:

a. comminution of ores in water to obtain an aqueous mixture,
b. adjusting the pH of the aqueous mixture obtained in step a) to obtain a pH adjusted aqueous mixture,
c. optionally, conditioning of the ores with depressants and/or activators,
d. adding the collector composition to the pH adjusted aqueous mixture,
e. agitating the pH adjusted aqueous mixture obtained in step d) under air injection to generate froth, and
f. collection of the mineral selected from lithium containing silicates and magnesium containing silicates, wherein the collector composition is as defined as above.

In another preferred embodiment, the collector composition comprising component (A) and component (B) is charged as a blend in step d. or component (A) and component (B) are charged separately.

In another preferred embodiment, the direct flotation process and the reverse flotation process comprise the step of adding one or more modifiers and/or one or more frothers before step d.

In another preferred embodiment, the amount of the composition which is added in step d. is in the range of 10 g to 10 Kg per 1000 kg mineral; more preferably the amount of the composition added in step d. is in the range of 10 g to 5.0 Kg per 1000 kg mineral; even more preferably the amount of the composition added in step d. is in the range of 50 g to 2.0 Kg per 1000 kg mineral; most preferably the overall amount of the composition added in step d. is in the range of 100 g to 1.0 Kg per 1000 kg mineral; and in particular the amount of the composition added in step d. is in the range of 200 g to 500 g per 1000 kg mineral.

In another preferred embodiment, the presently claimed invention is directed to a composition for the beneficiation of lithium silicate and magnesium silicate from an ore consisting of silicate minerals, comprising:

A. at least one component (A) selected from compounds of formula (I) and salts thereof,

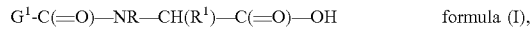

$$G^1-C(=O)-NR-CH(R^1)-C(=O)-OH \qquad \text{formula (I)},$$

wherein $G^1$ is a linear or branched, substituted or unsubstituted, saturated or unsaturated $C_6$-$C_{30}$ hydrocarbon chain; and
R and $R^1$ independent of each other are selected from the group consisting of hydrogen and linear or branched, substituted or unsubstituted, saturated or unsaturated $C_1$-$C_{30}$ hydrocarbon chain; and B. at least one component (B) selected from the group consisting of saturated or unsaturated alcohol containing at least 10 carbon atoms (B1) and an ester containing at least 10 carbon atoms (B2) which is derived from a mono-, di- or tri-functional carboxylic acid;

more preferably the composition comprises:

A. at least one component (A) selected from compounds of formula (I) and salts thereof,

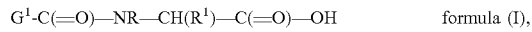

$$G^1-C(=O)-NR-CH(R^1)-C(=O)-OH \qquad \text{formula (I)},$$

wherein $G^1$ is a linear or branched, substituted or unsubstituted, saturated or unsaturated $C_8$-$C_{30}$ hydrocarbon chain; and
R and $R^1$ independent of each other are selected from the group consisting of hydrogen and linear or branched, substituted or unsubstituted, saturated or unsaturated $C_1$-$C_{20}$ hydrocarbon chain; and B. at least one component (B) selected from the group consisting of saturated or unsaturated alcohols containing at least 10 carbon atoms (B1) and an ester containing at least 10 carbon atoms (B2) derived from a mono-, di- or t tri-functional carboxylic acid;

even more preferably the composition comprises:

A. at least one component (A) selected from compounds of formula (I) and salts thereof,

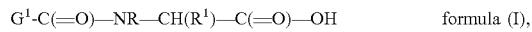

$$G^1-C(=O)-NR-CH(R^1)-C(=O)-OH \qquad \text{formula (I)},$$

wherein $G^1$ is a linear or branched, substituted or unsubstituted, saturated or unsaturated $C_{10}$-$C_{24}$ hydrocarbon chain; and
R and $R^1$ independent of each other are selected from the group consisting of hydrogen and linear or branched, substituted or unsubstituted, saturated or unsaturated $C_1$-$C_{10}$ hydrocarbon chain; and B. at least one component (B) selected from the group consisting of saturated or unsaturated alcohols containing at least 10 carbon atoms (B1) and an ester containing at least 10 carbon atoms (B2) derived from a mono-, di- or tri-functional carboxylic acid;

most preferably the composition comprises:

A. at least one component (A) selected from compounds of formula (I) and salts thereof,

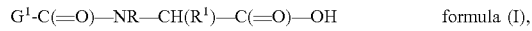

$$G^1-C(=O)-NR-CH(R^1)-C(=O)-OH \qquad \text{formula (I)},$$

wherein $G^1$ is a linear or branched, substituted or unsubstituted, saturated or unsaturated $C_{12}$-$C_{22}$ hydrocarbon chain; and
R and $R^1$ independent of each other are selected from the group consisting of hydrogen and linear or branched, substituted or unsubstituted, saturated or unsaturated $C_1$-$C_6$ hydrocarbon chain; and B. at least one component (B) selected from the group consisting of saturated or unsaturated alcohols containing at least 10 carbon atoms (B1) and an ester containing at least 10 carbon atoms (B2) derived from a mono-, di- or tri-functional carboxylic acid; and in particular the composition comprises:
A. at least one component (A) is selected from compounds of formula (I) and salts thereof,

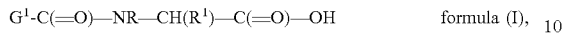

$G^1\text{-}C(=O)\text{—}NR\text{—}CH(R^1)\text{—}C(=O)\text{—}OH$     formula (I), wherein $G^1$ is a linear or branched, saturated or unsaturated $C_{14}$-$C_{18}$ hydrocarbon chain; and
R and $R^1$ independent of each other are selected from the group consisting of hydrogen and linear or branched, saturated $C_1$-$C_3$ hydrocarbon chain; and
B. at least one component (B) selected from the group consisting of saturated or unsaturated alcohols containing at least 10 carbon atoms (B1) and an ester containing at least 10 carbon atoms (B2) derived from a mono-, di- or tri-functional carboxylic acid.

In another preferred embodiment, the composition comprises at least one frother (C).

In another preferred embodiment, the at least one frother (C) is selected from the group consisting of pine oil, aliphatic $C_5$-$C_8$ alcohols, cresylic acids, polyglycols and polyglycol ethers.

In another preferred embodiment, the at least one frother (C) is present in an amount in the range of ≥0 wt. % to ≤70 wt. %, based on the total weight of the collector composition.

In another preferred embodiment, the composition comprises at least one modifier (D).

In another preferred embodiment, the at least one modifier (D) is selected from the group consisting of sodium silicate, sodium metaphosphate, polyhydric organic acids, quebracho and tannin.

In another preferred embodiment, the polyhydric organic acids are selected from oxalic acid, citric acid, tartaric acid and lactic acid.

In another preferred embodiment, the at least one modifier (D) is present in an amount in the range of ≥0 wt. % to ≤70 wt. %, based on the total weight of the collector composition.

The presently claimed invention is associated with at least one of the following advantages:
(i) A high-grade concentrate is obtained in good yield by using the composition according to the presently claimed invention in comparatively low amounts.
(ii) A high-grade concentrate is obtained in a high yield from a low-grade mineral by using the composition according to the presently claimed invention.
(iii) The composition according to presently claimed invention is suitable for the separation of lithium silicates and magnesium silicates from a mixture of silicate minerals.
(iv) The composition of the presently claimed invention lead to the formation of a manageable metastable froth without compromising the flotation process.

Embodiments

In the following, there is provided a list of embodiments to further illustrate the present disclosure without intending to limit the disclosure to the specific embodiments listed below.
1. Use of a composition for the beneficiation of lithium silicate minerals and magnesium silicate minerals from an ore comprising different silicate minerals, wherein the composition comprises:
A. at least one component (A) selected from compounds of formula (I) and salts thereof,

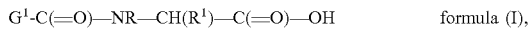

$G^1\text{-}C(=O)\text{—}NR\text{—}CH(R^1)\text{—}C(=O)\text{—}OH$     formula (I), wherein $G^1$ is a linear or branched, substituted or unsubstituted, saturated or unsaturated $C_6$-$C_{30}$ hydrocarbon chain; and
R and $R^1$ independent of each other are selected from the group consisting of hydrogen and linear or branched, substituted or unsubstituted, saturated or unsaturated $C_1$-$C_{30}$ hydrocarbon chain; and
B. at least one component (B) selected from the group consisting of saturated or unsaturated alcohols containing at least 10 carbon atoms (B1) and an ester containing at least 10 carbon atoms (B2) derived from a mono-, di- or tri-functional carboxylic acid.
2. The use according to embodiment 1, wherein the lithium silicate or magnesium silicate minerals are selected from the group consisting of spodumene, petalite, lepidolite, hectorite, olivine and forsterite.
3. The use according to embodiment 1 or 2, wherein $R^1$ is selected from the group consisting of hydrogen, —$CH_3$, —$CH(CH_3)CH_2CH_3$, —$CH_2$—$CH(CH_3)CH_3$, —$CH(CH_3)_2$, —$CH_2CH_2SCH_3$, —$CH_2$-phenyl, —$CH_2$(indolyl), —$CH_2$—$C_4H_4$—OH, —$CH_2$—SH, —$CH_2CH_2C(=O)NH_2$, —$CH_2(OH)$ and —$CH(OH)CH_3$.
4. The use according to any one of embodiments 1 to 3, wherein R is selected from the group consisting of hydrogen, —$CH_3$, —$C_2H_5$ and —$C_3H_7$.
5. The use according to any one of embodiments 1 to 4, wherein $G^1$ is a linear or branched, unsubstituted, saturated or unsaturated $C_8$-$C_{20}$ hydrocarbon chain.
6. The use according to any one of the embodiments 1 to 5, wherein the salts are selected from the group consisting of sodium salts, potassium salts and ammonium salts.
7. The use according to any one of embodiments 1 to 6, wherein the compound of formula (I) and salts thereof is selected from the group consisting of N-oleoyl sarcosine, N-lauroyl sarcosine, N-cocoyl sarcosine, N-myristoyl sarcosine, N-palmityl sarcosine, N-stearyl sarcosine, N-vaccenyl sarcosine, N-eicosenoyl sarcosine, N-erucyl sarcosine, N-eicosadienoyl sarcosine, N-docosadienoyl sarcosine, N-linolenyl sarcosine, N-linoleyl sarcosine, sodium N-oleoyl sarcosinate, sodium N-lauroyl sarcosinate, sodium N-cocoyl sarcosinate, sodium N-myristoyl sarcosinate, sodium N-palmityl sarcosinate, sodium N-stearyl sarcosinate, sodium N-vaccenyl sarcosinate, sodium N-eicosenoyl sarcosinate, sodium N-erucyl sarcosinate, sodium N-eicosadienoyl sarcosinate, sodium N-docosadienoyl sarcosinate, sodium N-linolenyl sarcosinate, sodium N-linoleyl sarcosinate, potassium N-oleoyl sarcosinate, potassium N-lauroyl sarcosinate, potassium N-cocoyl sarcosinate, potassium N-myristoyl sarcosinate, potassium N-palmityl sarcosinate, potassium N-stearyl sarcosinate, potassium N-vaccenyl sarcosinate, potassium N-eicosenoyl sarcosinate, potassium N-erucyl sarcosinate, potassium N-eicosadienoyl sarcosinate, potassium N-docosadienoyl sarcosinate, potassium N-linolenyl sarcosinate, potassium N-linoleyl sarcosinate, ammonium N-oleoyl sarcosinate, ammonium N-lauroyl sarcosinate, ammonium N-cocoyl sarcosinate, ammonium N-myristoyl sarcosinate, ammonium N-palmityl sarcosinate, ammonium N-stearyl sarcosinate, ammonium N-vaccenyl sarcosinate, ammonium N-eicosenoyl sarcosinate, ammonium N-erucyl sarcosinate, ammonium N-eicosadienoyl sarcosinate, ammonium N-docosadienoyl sarcosinate, ammonium N-linolenyl sarcosinate and ammonium N-linoleyl sarcosinate.

8. The use according to any one of embodiments 1 to 7, wherein the saturated or unsaturated alcohols (B1) contain 10 to 40 carbon atoms.
9. The use according to any one of embodiments 1 or 8, wherein the saturated or unsaturated alcohols (B1) have a degree of branching in the range of 1 to 3.
10. The use according to any one of embodiments 1 to 9, wherein the saturated or unsaturated alcohol (B1) is a branched, saturated $C_{10}$-$C_{16}$ alcohols.
11. The use according to any one of embodiments 1 to 10, wherein the esters containing at least 10 carbon atoms (B2) are selected from the group consisting of monoesters containing at least 10 carbon atoms (B2a), diesters containing at least 10 carbon atoms (B2b) and triesters containing at least 10 carbon atoms (B2c).
12. The use according to embodiment 11, wherein the monoesters containing at least 10 carbon atoms (B2a) are selected from the group consisting of caproic acid butyl ester, caproic acid pentyl ester, caproic acid hexyl ester, caproic acid cyclohexyl ester, caproic acid octyl ester, caproic acid isooctyl ester, caproic acid nonyl ester, caproic acid decyl ester, caproic acid lauryl ester, caproic acid myristyl ester, caproic acid cetyl ester, caproic acid pamitoleyl ester, caproic acid heptadecyl ester, caproic acid stearyl ester, caproic acid oleyl ester, caproic acid nonadecyl ester, caproic acid arachidyl ester, caproic acid henicosyl ester, caproic acid behenyl ester, caproic acid erucyl ester, caprylic acid butyl ester, caprylic acid pentyl ester, caprylic acid hexyl ester, caprylic acid cyclohexyl ester, caprylic acid octyl ester, caprylic acid isooctyl ester, caprylic acid nonyl ester, caprylic acid decyl ester, caprylic acid lauryl ester, caprylic acid myristyl ester, caprylic acid cetyl ester, caprylic acid pamitoleyl ester, caprylic acid heptadecyl ester, caprylic acid stearyl ester, caprylic acid oleyl ester, caprylic acid nonadecyl ester, caprylic acid arachidyl ester, caprylic acid henicosyl ester, caprylic acid behenyl ester, caprylic acid erucyl ester, capric acid butyl ester, capric acid pentyl ester, capric acid hexyl ester, capric acid cyclohexyl ester, capric acid octyl ester, capric acid isooctyl ester, capric acid nonyl ester, capric acid decyl ester, capric acid lauryl ester, capric acid myristyl ester, capric acid cetyl ester, capric acid pamitoleyl ester, capric acid heptadecyl ester, capric acid stearyl ester, capric acid oleyl ester, capric acid nonadecyl ester, capric acid arachidyl ester, capric acid henicosyl ester, capric acid behenyl ester, capric acid erucyl ester, lauric acid butyl ester, lauric acid pentyl ester, lauric acid hexyl ester, lauric acid cyclohexyl ester, lauric acid octyl ester, lauric acid isooctyl ester, palmitic acid butyl ester, palmitic acid pentyl ester, palmitic acid hexyl ester, palmitic acid cyclohexyl ester, palmitic acid octyl ester, palmitic acid isooctyl ester, palmitic acid nonyl ester, palmitic acid decyl ester, palmitic acid lauryl ester, palmitic acid myristyl ester, palmitic acid cetyl ester, palmitic acid pamitoleyl ester, palmitic acid heptadecyl ester, palmitic acid stearyl ester, palmitic acid oleyl ester, palmitic acid nonadecyl ester, palmitic acid arachidyl ester, palmitic acid henicosyl ester, palmitic acid behenyl ester, palmitic acid erucyl ester, d nonyl ester, lauric acid decyl ester, lauric acid lauryl ester, lauric acid myristyl ester, lauric acid cetyl ester, lauric acid pamitoleyl ester, lauric acid heptadecyl ester, lauric acid stearyl ester, lauric acid oleyl ester, lauric acid nonadecyl ester, lauric acid arachidyl ester, lauric acid henicosyl ester, lauric acid behenyl ester, lauric acid erucyl ester, myristic acid butyl ester, myristic acid pentyl ester, myristic acid hexyl ester, myristic acid cyclohexyl ester, myristic acid octyl ester, myristic acid isooctyl ester, myristic acid nonyl ester, myristic acid decyl ester, myristic acid lauryl ester, myristic acid myristyl ester, myristic acid cetyl ester, myristic acid pamitoleyl ester, myristic acid heptadecyl ester, myristic acid stearyl ester, myristic acid oleyl ester, myristic acid nonadecyl ester, myristic acid arachidyl ester, myristic acid henicosyl ester, myristic acid behenyl ester, myristic acid erucyl ester, stearic acid butyl ester, stearic acid pentyl ester, stearic acid hexyl ester, stearic acid cyclohexyl ester, stearic acid octyl ester, stearic acid isooctyl ester, stearic acid nonyl ester, stearic acid decyl ester, stearic acid lauryl ester, stearic acid myristyl ester, stearic acid cetyl ester, stearic acid pamitoleyl ester, stearic acid heptadecyl ester, stearic acid stearyl ester, stearic acid oleyl ester, stearic acid nonadecyl ester, stearic acid arachidyl ester, stearic acid henicosyl ester, stearic acid behenyl ester, stearic acid erucyl ester, benzoic acid butyl ester, benzoic acid pentyl ester, benzoic acid hexyl ester, benzoic acid cyclohexyl ester, benzoic acid octyl ester, benzoic acid isooctyl ester, benzoic acid nonyl ester, benzoic acid decyl ester, benzoic acid lauryl ester, benzoic acid myristyl ester, benzoic acid cetyl ester, benzoic acid pamitoleyl ester, benzoic acid heptadecyl ester, benzoic acid stearyl ester, benzoic acid oleyl ester, benzoic acid nonadecyl ester, benzoic acid arachidyl ester, benzoic acid henicosyl ester, benzoic acid behenyl ester and benzoic acid erucyl ester.
13. The use according to embodiment 11, wherein the diesters containing at least 10 carbon atoms (B2b) are selected from the group consisting of adipates, sebacates, maleates, phthalates, terephthalates, isophthalates and cyclohexane dicarboxylic acid dialkyl esters.
14. The use according to embodiment 11, wherein the diesters containing at least 10 carbon atoms (B2b) are selected from the group consisting of 1,2-cyclohexane dicarboxylic acid diisononyl ester, 1,2-cyclohexane dicarboxylic acid dinonyl ester, 1,2-cyclohexane dicarboxylic acid isohexyl pentyl ester, 1,2-cyclohexane dicarboxylic acid diisobutyl ester, 1,2-cyclohexane dicarboxylic acid di(2-ethylhexyl) ester, 1,2-cyclohexane dicarboxylic acid didecyl ester, 1,2-cyclohexane dicarboxylic acid nonyl 3-pentyl ester, 1,2-cyclohexane dicarboxylic acid di(2-methylbutyl) ester, 1,2-cyclohexane dicarboxylic acid hexyl octyl ester, diisodecyl adipate, diisotridecyl adipate, dioctyl adipate, diisononyl adipate, diisobutyl phthalate, dibutyl phthalate, diisoheptyl phthalate, dioctyl phthalate, diisooctyl phthalate, dinonyl phthalate, diisononyl phthalate, diisodecyl phthalate, diundecyl phthalate, diisoundecyl phthalate, undecyl dodecyl phthalate, diisotridecyl phthalate, butyl benzyl phthalate, di-2-ethylhexyl sebacate and di-2-ethylhexyl azelate.
15. The use according to embodiment 11, wherein the triesters containing at least 10 carbon atoms (B2c) are selected from the group consisting of, tri(2-ethylhexyl) trimellitate, tridecyl trimellitate, tricaprylyl trimellitate, triisodecyl trimellitate, tri(isotridecyl) trimellitate, tri(isononyl) trimellitate, tri(2-ethylhexyl)trimellitate, tri(2-propylheptyl)trimellitate, triheptyl trimellitate, trinonyl trimellitate and trioctyl trimellitate, 16. The use according to any of embodiments 1 to 15, wherein
A. the at least one component (A) is N-oleoyl sarcosine; and
B. the at least one component (B) is selected from the group consisting of di(isononyl)phthalate, di(2-ethylhexyl)phthalate, di(2-propylheptyl)phthalate, di(isononyl)adipate, di(2-propylheptyl)adipate, di(2-ethylhexyl)adipate and isotridecanol.

17. The use according to any of embodiments 1 to 16, wherein the amount of the at least one component (A) is in the range from ≥10 wt. % to ≤99 wt. %, based on the total weight of the composition.

18. The use according to any of embodiments 1 to 16, wherein the amount of the at least one component (B) is in the range from ≥1.0 wt. % to ≤90 wt. %, based on the total weight of the composition.

19. The use according to any of embodiments 1 to 18, wherein the composition comprises the at least one component (A) in an amount in the range from ≥10 wt. % to ≤99 wt. % and the at least one component (B) in an amount in the range from ≥1.0 wt. % to ≤90 wt. %, based on the total weight of the composition.

20. A direct flotation process for the beneficiation of lithium silicate and magnesium silicate from a silicate ore comprising the steps of:
a. comminution of ores in water to obtain an aqueous mixture,
b. adjusting the pH of the aqueous mixture obtained in step a) to obtain a pH adjusted aqueous mixture,
c. optionally, conditioning of the ores with depressants and/or activators,
d. adding the collector composition to the pH adjusted aqueous mixture,
e. agitating the pH adjusted aqueous mixture obtained in step d) under air injection to generate froth, and
f. collection of the mineral selected from lithium containing silicates and magnesium containing silicates in the froth,
wherein the collector composition is as defined as embodiments 1 to 19.

21. The direct flotation process according to embodiment 20, wherein the process comprises the step of adding one or more modifiers and/or one or more frothers before step d).

22. The direct flotation process according to embodiment 20 or 21, wherein the amount of the composition is in the range of 10.0 g to 2.0 Kg per 1000 kg mineral.

23. A reverse flotation process for the removal of lithium silicate and magnesium silicate from an ore comprising the steps of:
a. comminution of ores in water to obtain an aqueous mixture,
b. adjusting the pH of the aqueous mixture obtained in step a) to obtain a pH adjusted aqueous mixture,
c. optionally, conditioning of the ores with depressants and/or activators,
d. adding the collector composition to the pH adjusted aqueous mixture,
e. agitating the pH adjusted aqueous mixture obtained in step d) under air injection to generate froth, and
f. collection of the mineral selected from lithium containing silicates and magnesium containing silicates,
wherein the collector composition is as defined as embodiments 1 to 19.

24. The process according to embodiment 23, wherein the process comprises the step of adding one or more modifiers and/or one or more frothers before step d).

25. The reverse flotation process according to embodiment 23 or 24, wherein the amount of the composition is in the range of 10.0 g to 2.0 kg per 1000 kg mineral.

26. A composition for the beneficiation of lithium silicate and magnesium silicate from a silicate ore comprising:
A. at least one component (A) selected from compounds of formula (I) and salts thereof, $$G^1\text{-}C(=O)\text{-}NR\text{-}CH(R^1)\text{-}C(=O)\text{-}OH \qquad \text{formula (I),}$$

wherein $G^1$ is a linear or branched, substituted or unsubstituted, saturated or unsaturated $C_6\text{-}C_{30}$ hydrocarbon chain; and R and $R^1$ independent of each other are selected from the group consisting of hydrogen and linear or branched, substituted or unsubstituted, saturated or unsaturated $C_1\text{-}C_{30}$ hydrocarbon chain; and B. at least one component (B) selected from the group consisting of saturated or unsaturated alcohol containing at least 10 carbon atoms (B1) and an ester containing at least 10 carbon atoms (B2) which is derived from a mono-, di- or tri-functional carboxylic acid.

27. The composition according to embodiment 26, wherein the composition comprises at least one frother (C).

28. The composition according to embodiment 27, wherein the at least one frother (C) is selected from the group consisting of pine oil, aliphatic $C_5\text{-}C_8$ alcohols, cresylic acids, polyglycols and polyglycol ethers.

29. The composition according to embodiment 27 or 28, wherein the at least one frother (C) is present in an amount in the range of 0 wt. % to 70 wt. %, based on the total weight of the collector composition.

30. The composition according to embodiment 26, wherein the composition comprises at least one modifier (D).

31. The composition according to embodiment 30, wherein the at least one modifier (D) is selected from the group consisting of sodium silicate, sodium metaphosphate, polyhydric organic acids, quebracho and tannin.

32. The compositions according to embodiment 31, wherein the polyhydric organic acids are selected from oxalic acid, citric acid, tartaric acid and lactic acid.

33. The composition according to any one of embodiments 30 to 32, wherein the at least one modifier (D) is present in an amount in the range of ≥0 wt. % to ≤70 wt. %, based on the total weight of the collector composition.

EXAMPLES

The presently claimed invention is illustrated in detail by non-restrictive working examples which follow. More particularly, the test methods specified hereinafter are part of the general disclosure of the application and are not restricted to the specific working examples.

Materials

Tall oil fatty acid is available from Kraton under the trade name Sylfat® FA 1.

N-Oleoyl sarcosine is available from BASF SE.
Di(isononyl)phthalate is available from BASF SE.
Di(isononyl)adipate is available from BASF SE
Isotridecanol is available from BASF.

Example 1

The Spodumene ore was milled in a laboratory rod mill to give a flotation feed. The flotation feed (1 Kg) was placed in a 2.5 L flotation cell after removing the magnetic material and slimes. The slurry level was made up to the 2.5 L mark using tap water. The flotation cell was placed on a Denver flotation machine set at a rotational speed of 900 rpm and slurry temperature was maintained at 24-25° C. The collector composition was added, and the pH was adjusted to 8 using 10% aqueous solution of $Na_2CO_3$. The flotation feed was conditioned for 25, 13, 8 or 4 minutes depending on the collector composition as shown in Table 2. For conditioning time of 25, minutes, the conditioning was done in two steps. In the first step 60% of the targeted collector dose was added and conditioned for 15 minutes. Flotation was carried out and concentrate collected in the first 1 minute (con 1) and next 2 minutes (con 2). The air was stopped, and the rest of the collector was added, pH adjusted to 8 and conditioned for a further 10 minutes after which flotation was carried out for 3 minutes (con 3).

For total conditioning time of 13 minutes, the conditioning time was 8 minutes first conditioning and 5 minutes second conditioning.

For total conditioning time of 8 minutes, the conditioning time was 5 minutes first conditioning and 3 minutes second conditioning.

For total conditioning time of 4 minutes, the collector was added all at once. The concentrates were collected in the first 1 minute (con 1), next 2 minutes (con 2) and next 3 minutes (con 3). The 3 concentrates and the tailings were filtered, dried in an oven at 100° C. overnight. The dried concentrates were assayed.

TABLE 1

| Collector composition | |
|---|---|
| Composition 1* | N-oleoyl sarcosine (100 wt. %) |
| Composition 2* | tall Oil Fatty Acid (100 wt. %) |
| Composition 3 | N-oleoyl sarcosine (90 wt. %) + di(isononyl)phthalate (10 wt. %) |
| Composition 4 | N-oleoyl sarcosine (85 wt. %) + di(isononyl)phthalate (15 wt. %) |
| Composition 5 | N-oleoyl sarcosine (90 wt. %) + isotridecanol (10 wt. %) |
| Composition 6 | N-oleoyl sarcosine (80 wt. %) + isotridecanol (20 wt. %) |
| Composition 7 | N-oleoyl sarcosine (90 wt. %) + di(isononyl)adipate (10 wt. %) |
| Composition 8 | N-oleoyl sarcosine (85 wt. %) + di(isononyl)adipate (15 wt. %) |

*outside the scope of the presently claimed invention

TABLE 2

Spodumene flotation results

| Con 1 % $Li_2O$ | Con 2 % $Li_2O$ | Con 3 % $Li_2O$ | Combined Concentrate Grade % $Li_2O$ | Recovery % $Li_2O$ | Dosage g/t | Conditioning time Minutes | Collector composition |
|---|---|---|---|---|---|---|---|
| 5.02 | 3.93 | 2.45 | 3.91 | 81.2 | 450 | 25 | (1)* |
| 5.32 | 4.37 | 3.01 | 4.05 | 80.9 | 450 | 8 | (1)* |
| 5.11 | 4.04 | 2.29 | 3.91 | 83.8 | 450 | 13 | (1)* |
| 3.84 | 4.05 | 3.72 | 3.81 | 82.9 | 2500 | 25 | (2)* |
| 3.34 | 3.51 | 4.48 | 4.09 | 71.9 | 1875 | 25 | (2)* |
| 4.88 | 3.82 | 2.44 | 3.79 | 83.9 | 450 | 8 | (3) |
| 5.07 | 4.17 | 2.66 | 4.09 | 80.4 | 450 | 4 | (3) |
| 4.86 | 3.98 | 2.65 | 3.88 | 82.3 | 450 | 8 | (4) |
| 4.88 | 3.89 | 2.43 | 3.84 | 80.6 | 450 | 4 | (4) |
| 4.81 | 3.60 | 2.96 | 3.81 | 82.3 | 450 | 8 | (5) |
| 4.28 | 4.53 | 3.87 | 4.14 | 78.0 | 450 | 8 | (6) |

*outside the scope of the presently claimed invention

It is evident from the results that the use of the inventive collector composition resulted in a considerably higher concentrate grade in the rougher and first scavenger (con 1 and con 2) compared to the comparative 1 and 2. Additionally, the inventive collector compositions required less than half the conditioning time of the comparative examples.

Experiment 2:

The froth stability was determined as follows: The experiment performed similar to the experiment 1. The slurry level in the floatation cell was marked as 0 cm. The ore was condition for 10 minutes and floated by injecting 2 litres of air per minute and allowed to build the froth up to the 8 cm mark. Immediately after reaching the froth at 8 cm mark, air and the impeller was stopped. The froth decay was determined noting the froth levels at 0 seconds, 15 seconds, 30 seconds, 45 seconds and 60 seconds after air was stopped. The results for these tests are shown in Table 3 below.

TABLE 3

Froth stability results

| Dosage | Froth height after air aeration stopped (cm) | | | | | |
|---|---|---|---|---|---|---|
| g/t | 0 sec | 15 sec | 30 sec | 45 sec | 60 sec | Collector |
| 450 | 8 | 7.5 | 7.5 | 7.5 | 7.5 | (1)* |
| 2500 | 8 | 8 | 8 | 6 | 5 | (2)* |
| 450 | 8 | 7.5 | 7.5 | 7 | 7 | (3) |
| 450 | 8 | 7 | 6 | 4.5 | 3 | (4) |
| 450 | 8 | 7 | 7 | 7 | 7 | (5) |
| 450 | 8 | 7.5 | 7 | 6.5 | 6 | (6) |
| 450 | 8 | 7.5 | 7 | 7 | 6.5 | (7) |
| 450 | 8 | 7 | 6 | 4.5 | 3.5 | (8) |

*outside the scope of the presently claimed invention

It is apparent from Table 3 that the use of N-oleoyl sarcosine lead to formation of a stable froth. The compositions comprising alcohols and/or esters lead to the formation of a manageable metastable froth without compromising the flotation process.

The invention claimed is:

1. A method comprising beneficiating lithium silicate minerals and magnesium silicate minerals from an ore comprising different silicate minerals, utilizing a collector composition, wherein the collector composition comprises:
    A. at least one component (A) selected from compounds of formula (I) and salts thereof,

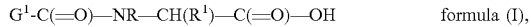
    $G^1$-C(=O)—NR—CH($R^1$)—C(=O)—OH      formula (I), wherein $G^1$ is a linear or branched, substituted or unsubstituted, saturated or unsaturated $C_6$-$C_{30}$ hydrocarbon chain; and
    R and $R^1$ independent of each other are selected from the group consisting of hydrogen and linear or branched, substituted or unsubstituted, saturated or unsaturated $C_1$-$C_{30}$ hydrocarbon chain; and
    B. at least one component (B) selected from the group consisting of saturated or unsaturated alcohols containing at least 10 carbon atoms (B1) and an ester containing at least 10 carbon atoms (B2) derived from a mono-, di- or tri-functional carboxylic acid.

2. The method according to claim 1, wherein the lithium silicate or magnesium silicate minerals are selected from the group consisting of spodumene, petalite, lepidolite, hectorite, olivine and forsterite.

3. The method according to claim 1, wherein $R^1$ is selected from the group consisting of hydrogen, —$CH_3$, —CH($CH_3$)$CH_2CH_3$, —$CH_2$—CH($CH_3$)$CH_3$, —CH($CH_3$)$_2$, —$CH_2CH_2SCH_3$, —$CH_2$-phenyl, —$CH_2$(indolyl), —$CH_2$-$C_4H_4$—OH, —$CH_2$—SH, —$CH_2CH_2$C(=O) $NH_2$, —$CH_2$(OH) and —CH(OH)$CH_3$.

4. The method according to claim 1, wherein R is selected from the group consisting of hydrogen, —$CH_3$, —$C_2H_5$ and —$C_3H_7$.

5. The method according to claim 1, wherein $G^1$ is a linear or branched, unsubstituted, saturated or unsaturated $C_8$-$C_{20}$ hydrocarbon chain.

6. The method according to claim 1, wherein the salts are selected from the group consisting of sodium salts, potassium salts and ammonium salts.

7. The method according to claim 1, wherein the compound of formula (I) and salts thereof is selected from the group consisting of N-oleoyl sarcosine, N-lauroyl sarcosine, N-cocoyl sarcosine, N-myristoyl sarcosine, N-palmityl sarcosine, N-stearyl sarcosine, N-vaccenyl sarcosine, N-eicosenoyl sarcosine, N-erucyl sarcosine, N-eicosadienoyl sarcosine, N-docosadienoyl sarcosine, N-linolenyl sarcosine, N-linoleyl sarcosine, sodium N-oleoyl sarcosinate, sodium N-lauroyl sarcosinate, sodium N-cocoyl sarcosinate, sodium N-myristoyl sarcosinate, sodium N-palmityl sarcosinate, sodium N-stearyl sarcosinate, sodium N-vaccenyl sarcosinate, sodium N-eicosenoyl sarcosinate, sodium N-erucyl sarcosinate, sodium N-eicosadienoyl sarcosinate, sodium N-docosadienoyl sarcosinate, sodium N-linolenyl sarcosinate, sodium N-linoleyl sarcosinate, potassium N-oleoyl sarcosinate, potassium N-lauroyl sarcosinate, potassium N-cocoyl sarcosinate, potassium N-myristoyl sarcosinate, potassium N-palmityl sarcosinate, potassium N-stearyl sarcosinate, potassium N-vaccenyl sarcosinate, potassium N-eicosenoyl sarcosinate, potassium N-erucyl sarcosinate, potassium N-eicosadienoyl sarcosinate, potassium N-docosadienoyl sarcosinate, potassium N-linolenyl sarcosinate, potassium N-linoleyl sarcosinate, ammonium N-oleoyl sarcosinate, ammonium N-lauroyl sarcosinate, ammonium N-cocoyl sarcosinate, ammonium N-myristoyl sarcosinate, ammonium N-palmityl sarcosinate, ammonium N-stearyl sarcosinate, ammonium N-vaccenyl sarcosinate, ammonium N-eicosenoyl sarcosinate, ammonium N-erucyl sarcosinate, ammonium N-eicosadienoyl sarcosinate, ammonium N-docosadienoyl sarcosinate, ammonium N-linolenyl sarcosinate and ammonium N-linoleyl sarcosinate.

8. The method according to claim 1, wherein the saturated or unsaturated alcohols (B1) contain 10 to 40 carbon atoms.

9. The method according to claim 1, wherein the saturated or unsaturated alcohols (B1) have a degree of branching in the range of 1 to 3.

10. The method according to claim 1, wherein the saturated or unsaturated alcohol (B1) is a branched, saturated $C_{10}$-$C_{16}$ alcohols.

11. The method according to claim 1, wherein the esters containing at least 10 carbon atoms (B2) are selected from the group consisting of monoesters containing at least 10 carbon atoms (B2a), diesters containing at least 10 carbon atoms (B2b) and triesters containing at least 10 carbon atoms (B2c).

12. The method according to claim 11, wherein the monoesters containing at least 10 carbon atoms (B2a) are selected from the group consisting of caproic acid butyl ester, caproic acid pentyl ester, caproic acid hexyl ester, caproic acid cyclohexyl ester, caproic acid octyl ester, caproic acid isooctyl ester, caproic acid nonyl ester, caproic acid decyl ester, caproic acid lauryl ester, caproic acid myristyl ester, caproic acid cetyl ester, caproic acid pamitoleyl ester, caproic acid heptadecyl ester, caproic acid stearyl ester, caproic acid oleyl ester, caproic acid nonadecyl ester, caproic acid arachidyl ester, caproic acid henicosyl ester, caproic acid behenyl ester, caproic acid erucyl ester, caprylic acid butyl ester, caprylic acid pentyl ester, caprylic acid hexyl ester, caprylic acid cyclohexyl ester, caprylic acid octyl ester, caprylic acid isooctyl ester, caprylic acid nonyl ester, caprylic acid decyl ester, caprylic acid lauryl ester, caprylic acid myristyl ester, caprylic acid cetyl ester, caprylic acid pamitoleyl ester, caprylic acid heptadecyl ester, caprylic acid stearyl ester, caprylic acid oleyl ester, caprylic acid nonadecyl ester, caprylic acid arachidyl ester, caprylic acid henicosyl ester, caprylic acid behenyl ester, caprylic acid erucyl ester, capric acid butyl ester, capric acid pentyl ester, capric acid hexyl ester, capric acid cyclohexyl ester, capric acid octyl ester, capric acid isooctyl ester, capric acid nonyl ester, capric acid decyl ester, capric acid lauryl ester, capric acid myristyl ester, capric acid cetyl ester, capric acid pamitoleyl ester, capric acid heptadecyl ester, capric acid stearyl ester, capric acid oleyl ester, capric acid nonadecyl ester, capric acid arachidyl ester, capric acid henicosyl ester, capric acid behenyl ester, capric acid erucyl ester, lauric acid butyl ester, lauric acid pentyl ester, lauric acid hexyl ester, lauric acid cyclohexyl ester, lauric acid octyl ester, lauric acid isooctyl ester, palmitic acid butyl ester, palmitic acid pentyl ester, palmitic acid hexyl ester, palmitic acid cyclohexyl ester, palmitic acid octyl ester, palmitic acid isooctyl ester, palmitic acid nonyl ester, palmitic acid decyl ester, palmitic acid lauryl ester, palmitic acid myristyl ester, palmitic acid cetyl ester, palmitic acid pamitoleyl ester, palmitic acid heptadecyl ester, palmitic acid stearyl ester, palmitic acid oleyl ester, palmitic acid nonadecyl ester, palmitic acid arachidyl ester, palmitic acid henicosyl ester, palmitic acid behenyl ester, palmitic acid erucyl ester, d nonyl ester, lauric acid decyl ester, lauric acid lauryl ester, lauric acid myristyl ester, lauric acid cetyl ester, lauric acid pamitoleyl ester, lauric acid heptadecyl ester, lauric acid stearyl ester, lauric acid oleyl ester, lauric acid nonadecyl ester, lauric acid arachidyl ester, lauric acid henicosyl ester, lauric acid behenyl ester, lauric acid erucyl ester, myristic acid butyl ester, myristic acid pentyl ester, myristic acid hexyl ester, myristic acid cyclohexyl ester, myristic acid octyl ester, myristic acid isooctyl ester, myristic acid nonyl ester, myristic acid decyl ester, myristic acid lauryl ester, myristic acid myristyl ester, myristic acid cetyl ester, myristic acid pamitoleyl ester, myristic acid heptadecyl ester, myristic acid stearyl ester, myristic acid oleyl ester, myristic acid nonadecyl ester, myristic acid arachidyl ester, myristic acid henicosyl ester, myristic acid behenyl ester, myristic acid erucyl ester, stearic acid butyl ester, stearic acid pentyl ester, stearic acid hexyl ester, stearic acid cyclohexyl ester, stearic acid octyl ester, stearic acid isooctyl ester, stearic acid nonyl ester, stearic acid decyl ester, stearic acid lauryl ester, stearic acid myristyl ester, stearic acid cetyl ester, stearic acid pamitoleyl ester, stearic acid heptadecyl ester, stearic acid stearyl ester, stearic acid oleyl ester, stearic acid nonadecyl ester, stearic acid arachidyl ester, stearic acid henicosyl ester, stearic acid behenyl ester, stearic acid erucyl ester, benzoic acid butyl ester, benzoic acid pentyl ester, benzoic acid hexyl ester, benzoic acid cyclohexyl ester, benzoic acid octyl ester, benzoic acid isooctyl ester, benzoic acid nonyl ester, benzoic acid decyl ester, benzoic acid lauryl ester, benzoic acid myristyl ester, benzoic acid cetyl ester, benzoic acid pamitoleyl ester, benzoic acid heptadecyl ester, benzoic acid stearyl ester, benzoic acid oleyl ester, benzoic acid nonadecyl ester, benzoic acid arachidyl ester, benzoic acid henicosyl ester, benzoic acid behenyl ester and benzoic acid erucyl ester.

13. The method according to claim 11, wherein the diesters containing at least 10 carbon atoms (B2b) are selected from the group consisting of adipates, sebacates, maleates, phthalates, terephthalates, isophthalates and cyclohexane dicarboxylic acid dialkyl esters.

14. The method according to claim 11, wherein the diesters containing at least 10 carbon atoms (B2b) are selected from the group consisting of 1,2-cyclohexane dicarboxylic acid diisononyl ester, 1,2-cyclohexane dicarboxylic acid dinonyl ester, 1,2-cyclohexane dicarboxylic acid isohexyl pentyl ester, 1,2-cyclohexane dicarboxylic acid diisobutyl ester, 1,2-cyclohexane dicarboxylic acid di(2-ethylhexyl) ester, 1,2-cyclohexane dicarboxylic acid didecyl ester, 1,2-cyclohexane dicarboxylic acid nonyl 3-pentyl ester, 1,2-cyclohexane dicarboxylic acid di(2-methylbutyl) ester, 1,2-cyclohexane dicarboxylic acid hexyl octyl ester, diisodecyl adipate, diisotridecyl adipate, dioctyl adipate, diisononyl adipate, diisobutyl phthalate, dibutyl phthalate, diisoheptyl phthalate, dioctyl phthalate, diisooctyl phthalate, dinonyl phthalate, diisononyl phthalate, diisodecyl phthalate, diundecyl phthalate, diisoundecyl phthalate, undecyl dodecyl phthalate, diisotridecyl phthalate, butyl benzyl phthalate, di-2-ethylhexyl sebacate and di-2-ethylhexyl azelate.

15. The method according to claim 11, wherein the triesters containing at least 10 carbon atoms (B2c) are selected from the group consisting of, tri(2-ethylhexyl) trimellitate, tridecyl trimellitate, tricaprylyl trimellitate, triisodecyl trimellitate, tri(isotridecyl) trimellitate, tri(isonony]) trimellitate, tri(2-ethylhexyl) trimellitate, tri(2-propylheptyl) trimellitate, triheptyl trimellitate, trinonyl trimellitate and trioctyl trimellitate.

16. The method according to claim 1, wherein
   A. the at least one component (A) is N-oleoyl sarcosine; and
   B. the at least one component (B) is selected from the group consisting of di(isononyl)phthalate, di(2-ethylhexyl)phthalate, di(2-propylheptyl)phthalate, di(isononyl)adipate, di(2-ethylhexyl)adipate, di(2-propylheptyl)adipate and isotridecanol.

17. The method according to claim 1, wherein the composition comprises the at least one component (A) in an amount in the range from ≥10 wt. % to ≤99 wt. % and the at least one component (B) in an amount in the range from ≥1.0 wt. % to ≤ 90 wt. %, based on the total weight of the composition.

18. The method according to claim 1, wherein the amount of the at least one component (B) is in the range from ≥1.0 wt. % to ≤90 wt. %, based on the total weight of the composition.

19. The method according to claim 1, wherein the composition comprises the at least one component (A) in an amount in the range from ≥10 wt. % to ≤99 wt. % and the at least one component (B) in an amount in the range from ≥1.0 wt. % to ≤ 90 wt. %, based on the total weight of the composition.

20. A direct flotation process for the beneficiation of lithium silicate and magnesium silicate from a silicate ore comprising the steps of:
   a. comminution of ores in water to obtain an aqueous mixture,
   b. adjusting the pH of the aqueous mixture obtained in step a) to obtain a pH adjusted aqueous mixture,
   c. optionally, conditioning of the ores with depressants and/or activators,
   d. adding a collector composition to the pH adjusted aqueous mixture,
   e. agitating the pH adjusted aqueous mixture obtained in step d) under air injection to generate froth, and f. collection of the mineral selected from lithium containing silicates and magnesium containing silicates in the froth, wherein the collector composition is as defined in claim 1.

21. The method according to claim 1, wherein the method comprises adding the collector composition to an aqueous solution of the ore.

* * * * *